United States Patent
Grossenbacher

[11] 3,909,661
[45] Sept. 30, 1975

[54] ELECTRONIC CONTROL FOR AUTOMOBILE LIGHTS

[76] Inventor: Robert E. Grossenbacher, 1950 22nd Ave., San Francisco, Calif. 94116

[22] Filed: July 22, 1974

[21] Appl. No.: 490,405

[52] U.S. Cl. .................. 315/82; 307/10 LS
[51] Int. Cl.² ........................... B60Q 1/04
[58] Field of Search .......... 315/82, 83; 307/10 LS

[56] References Cited
UNITED STATES PATENTS
3,818,267   6/1974   Hill et al. .......................... 315/82

*Primary Examiner*—James B. Mullins
*Attorney, Agent, or Firm*—George B. White

[57] ABSTRACT

An electronic circuit is described which is adapted to be interconnected with conventional automobile lighting circuitry systems for automatically turning off lights of the automobile after a time delay if those lights have been inadvertently left on when the ignition switch is turned off.

6 Claims, 3 Drawing Figures

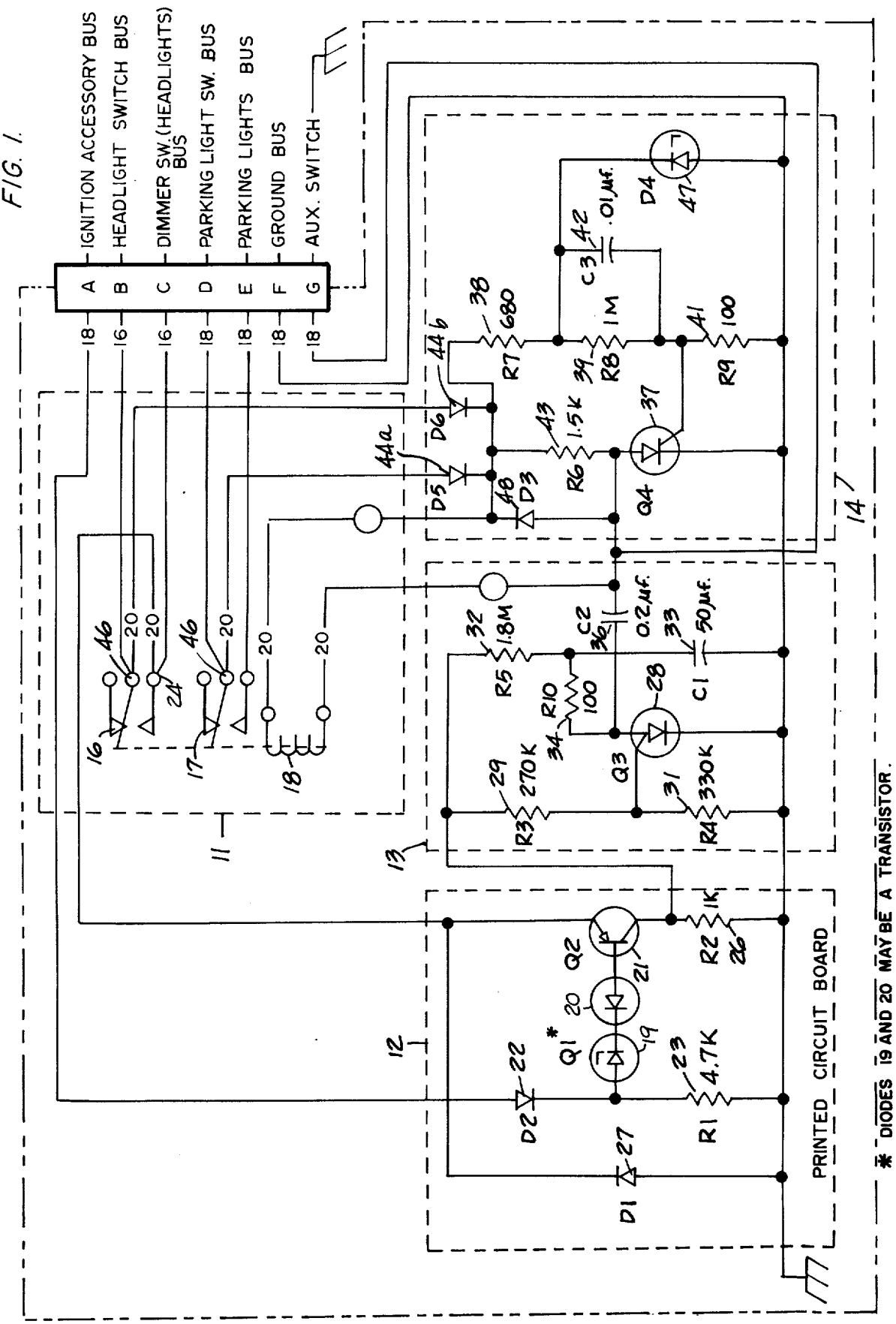

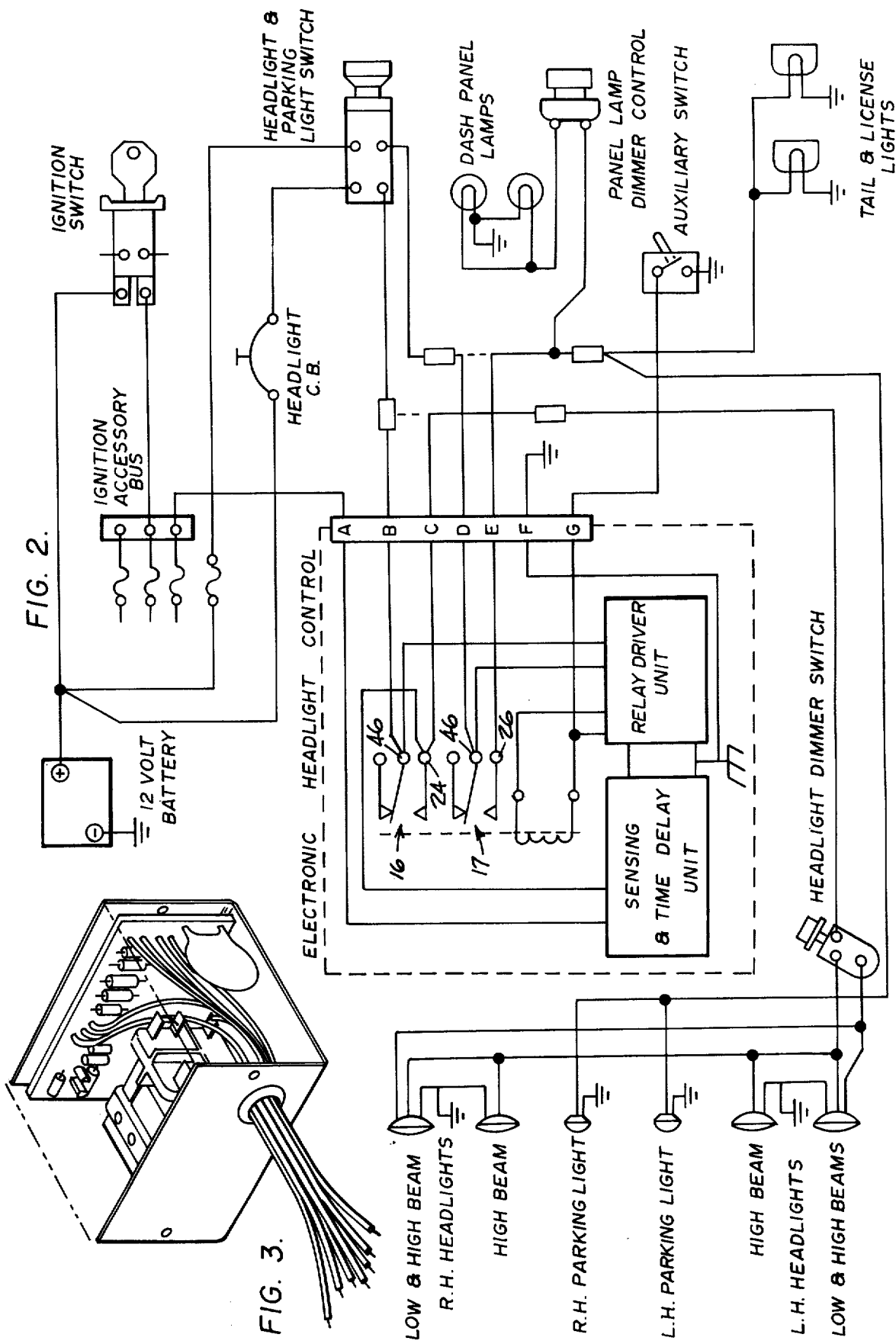

3,909,661

ELECTRONIC CONTROL FOR AUTOMOBILE LIGHTS

BACKGROUND OF THE INVENTION

1. Field of the Invention

The invention relates to an electronic time delay circuit for automatically interrupting lighting circuits of an automobile which have been inadvertently left energized after the ignition switch is turned off.

2. Prior Art

One of the most annoying and inconvenient experiences a motorist can have is to find his car with a dead or discharged battery because he had carelessly left the car lights on. Specifically, conventional lighting circuitry systems in automobiles are not interconnected with the ignition switch and, for that reason, are frequently left on after the operator has left the car. The burning lights constitute a relatively large current drain on the battery which discharges the battery in a relatively short time. Accordingly, when the motorist returns to his car, his battery typically is dead and he must obtain assistance to start his car.

While many automatic circuitry systems are suggested in the prior art for interrupting or disabling lighting circuits in an automobile, none are sufficiently flexible to allow the large number of diverse uses to which motorists put their automobile lights.

For example, a motorist may desire to use his headlights as a light source for purposes other than lighting the way when operating the automobile. He also may wish to leave the parking lights on when he is parked on streets or highways for a short period of time while he is outside the automobile.

Another drawback of the automatic disabling circuitry systems suggested in the prior art for automobile lighting circuits is that they do not provide fail-safe protection. Specifically, it is possible for many of the automatic disabling circuits to operate while the car is being driven. For example, in a typical circuit described in U.S. Pat. No. 3389296, issued to W. B. Carruth, the transistors which short out the locking circuit holding the normally open relay closed making the connection between the battery and the lights, may suddenly become conducting due to a failure somewhere in the ignition circuitry system whereupon the relay will open and cut off the automobile lights. Accordingly, if the circuit becomes disabled, the automobile lights cannot be turned on either manually or otherwise since the relay between the power source and the light circuit cannot be closed.

SUMMARY OF THE INVENTION

An electronic circuit is described for automatically interrupting lighting circuits of an automobile which have been left energized after the ignition switch is turned off. The electronic circuit includes time delay means which allows the automobile lights to be utilized as an alternate light source for a short period of time. The circuit is also designed to allow the operator of an automobile to leave certain of the automobile lighting circuits energized (e.g., parking lights). Finally, the described circuit is relatively simple and can be installed in existing automobiles without significantly altering the pre-existing lighting circuits.

DESCRIPTION OF THE FIGURES

FIG. 1 is a detailed schematic of the invented electronic control circuit.

FIG. 2 is a line drawing showing how the invented control circuit is incorporated into a conventional, electrical lighting circuitry system of an automobile.

FIG. 3 is a perspective view of the electronic control circuit package ready for installation in an automobile.

DETAILED DESCRIPTION OF THE INVENTION

Referring to the schematic shown in FIG. 1, the invented automatic electronic disabling circuit for automobile lights basically includes 4 different units: the relay unit (11); the sensing unit (12); the delay unit (13); and the relay-driver unit (14).

The relay unit (11) is a conventional electrically energized relay switch having 2 normally open relay contacts (16 and 17) and an energizing coil (18) for closing the relays (16 and 17).

The relay-driver unit (14) includes a silicon-controlled switch (SCR) (37) and a voltage pulse generating circuit consisting of the resistances (38, 39 & 41), the capacitor (42) and the diode (47). The anode of the SCR (37) is connected to one terminal of the energizing coil (18). The other terminal of the energizing coil (18) is connected to the energizing posts of both relays (16 and 17) through the diodes (44a and 44b). A resistance (43) and a diode (48) are connected in parallel with the energizing coil (18) between the anode of the SCR (37) and the diodes (43a and 43b). The cathode of the SCR (37) is connected to ground.

The gate of the SCR (37) is connected to a pulse forming circuit which, in the depicted embodiment, comprises the resistances (38, 39 &41) connected in series between the diodes (44a and 44b) and ground, a capacitor (42) connected in parallel with the resistance (39), and a zener diode (47) connected in parallel with the resistances (39 and 41) with its anode connected to ground. The gate of the SCR (37) is connected between the resistances (39 and 41).

The relay-driver circuit unit (14) functions as follows: When either the headlight or parking light switch bus is energized, a voltage step is applied to the pulse forming circuit through the diodes (44a and 44b) whereupon the pulse forming circuit generates a triggering voltage pulse at the gate of the SCR (37). The voltage pulse at the gate of the SCR (37) switches the SCR (37) from an off or nonconducting state to an or conducting state, thus closing the circuit from the relays (16 and 17) to ground through coil (18). Since the inductance of coil (18) causes current flow through it to lag behind the triggering voltage pulse that is applied at the gate of SCR (37), resistance (43) provides sufficient current for the SCR (37) to turn "on" or go into a conducting state during the transient time period of the triggering pulse. Specifically, the SCR (37) requires a certain amount of current in order to switch into a conducting state and stay in a conducting state, and resistance (43) provides this current. The current through resistance (43) is important only during the initial turn on period since the steady state current through coil (18) will greatly exceed the current through resistance (43).

Current flow through the coil (18) energizes and closes the relays (16 and 17) which in turn closes the circuit between the light switch on the dashboard of the automobile and the lights of the automobile.

The SCR (37) can be switched to an off or nonconducting state either by de-energizing the headlight and parking light buses or by action of the delay unit (13), as described infra.

The zener diode (47) prevents spurious switching of the SCR (37). In explanation, when the SCR (37) is switched to an off or non-conducting state by the action of the delay unit (13), the relays (16 & 17) open and turn off the headlights and parking lights. When the headlights and parking lights are turned off, a large electrical load is removed from the battery causing the battery potential to rise. This rise in battery potential appears on the headlight switch and parking light buses (B & D), and the pulse forming circuit converts this rise to a small pulse at the gate of SCR (37). Such a small pulse may be sufficient to switch the SCR (37) from the off or non-conducting state to an on or conducting state, re-energizing the headlight and parking light buses (B & D).

To prevent the spurious switching, the voltage value of the zener diode (47) is selected to be several volts below the nominal battery potential of the automobile, thereby essentially shorting out any voltage pulses above the voltage value of the zener diode (47). For example, if the nominal battery voltage is 12 volts, the voltage value zener diode should be approximately 8 volts, whereby the diode (47) prevents the pulse forming circuit from "seeing" a potential in excess of 8 volts.

The diode (48) supresses transient voltage pulses produced when the current through the coil is interrupted by either de-energizing the headlight and parking light buses or by action of the delay unit (13). In essence, the diode (48) protects the SCR (37) from the voltage and current pulses produced by the coil (18) when it is de-energized.

The sensing unit (12) includes a PNP transistor (21), a zener diode (19) and a blocking diode (20). The anode of the zener diode (19) is connected to the ignition accessory bus through a diode (22). A resistance (23) is connected between the anode of the zener diode (19) and ground, such that battery potential exists between it and ground when the ignition accessory bus is energized. The cathode of the zener diode (19) is connected to the cathode of the blocking diode (20). The anode of the blocking diode in turn is connected to the base of transistor (21).

The emitter of transistor (21) is connected to the relay post (24) of relay (16) and its collector is connected to ground through a resistance (26). A diode (27) with its cathode connected to the emitter of the transistor (21) and its anode connected to ground, supresses negative voltage transients (relative to ground) that could damage the transistor (21). Such negative transients result from any inductive load on the headlight dimmer switch bus (C).

The zener voltage valve of the zener diode (19) is selected at a value of about five volts such that it only becomes conductive when a potential greater than five volts is impressed across the diode.

The sensing unit (12) operates in the following manner:

When the headlight switch bus (B) is energized, the relay driver circuit (14) closes relay (16). With relay (16) closed, the emitter of transistor (21) is raised to a potential above ground equal to the automobile battery potential. When the ignition accessory bus (A) is energized, the potential of the anode of zener diode (19) is about the same as the emitter of transistor (21) and therefore transistor (21) is cut off. With transistor (21) cut off, there exists no potential drop across resistor (26). Now when the ignition accessory bus (A) is de-energized, the anode of the zener diode (19) is allowed to drop below battery potential. Resistor (23) is of a value that allows sufficient base current to cause transistor (21) to go into saturation. With transistor (21) in saturation, the potential across resistor (26), which is the voltage output of the sensing unit (12), is approximately equal to the battery potential. Since the zener voltage value of the zener diode (19) is about five volts, the anode of the zener diode (19) has to be at a potential greater than six volts below the emitter of transistor (21) before transistor (21) will start to conduct. Therefore small variations of voltage between the headlight switch bus (B) and the ignition accessory bus (A) will have no effect on transistor (21). Diode (22) blocks current from flowing from the headlight switch bus (B) to the ignition accessory bus (A) when the headlights are on and the ignition is off. Likewise, the blocking diode (20) prevents current from flowing from the ignition accessory bus (A) through the base emitter junction of transistor (21), which would be experiencing reverse voltage breakdown, to the headlight dimmer switch bus (C). In effect, the sensing unit (12) senses when the ignition accessory bus (A) is de-energized and the automobile headlight bus (B) is energized and generates a voltage output responsive to that condition.

The timing unit (13) consists of a programmable, unijunction transistor (PUT) (28), 2 resistances functioning as a voltage divider, and an RC circuit, including a resistance (32) and a capacitor (33). The resistances (29 and 31) are connected in series between the voltage output of the sensing unit (12) and ground. The resistance (32) and the capacitor (33) forming the RC circuit are connected between the voltage output of the sensing curcuit and ground in parallel with the dividing resistances. The PUT (28) is connected as a diode with its programming junction connected between the resistances (29 and 31), its cathode connected to ground and its anode connected through a resistance (43) between the resistance (32) and the capacitor (33), forming the RC circuit. A commutating capacitor (36) connects the anode of the PUT (28) of the timing unit to the anode of the SCR (37) of the relay-driver unit.

The timing unit (13) operates as follows: Initially the PUT (28) is in an off or nonconducting state. Upon receiving the voltage output from the sensing unit (12), a potential is impressed on the programming gate of the PUT (28). The magnitude of the potential is determined by the resistances (29 and 31) which function as a voltage divider. The voltage output from the sensing unit also charges capacitor (33) and the commutating capacitor (36). When the potential across the capacitor (33) reaches a threshold value, the PUT (28) becomes conductive, discharging both the capacitor (33) and the commutating capacitor (36). As the commutating capacitor (36) discharges, the anode to cathode voltage across the SCR (37) becomes negative for a time period sufficient to cause the SCR (37) to switch off and become non-conductive. When the SCR (37)

switches off or becomes nonconductive, current flow through the relay coil (18) is interrupted and the relays (16 and 17) open, thereby interrupting or disabling the lighting circuits of the automobile.

Referring now to FIG. 2, the described automatic electronic light disabling circuit is incorporated into a conventional automobile circuitry system as follows: The ignition accessory bus (A) is connected to the ignition switch. The headlight switch bus (B) and the parking light switch bus (D) are connected to the respective connections in the manual headlight and parking light switch. The headlights are connected through a conventional headlight dimmer switch bus (C). The parking lights are connected to the parking light bus (E). An auxiliary bus (G), which provides means for the energizing coil (18) to by-pass the relay driver circuit (14), is connected to one terminal of a single pole single throw switch. The other terminal of the switch is connected to ground.

It should be noted that the parking lights can be turned on and left on. Specifically, the sensing unit is connected between the ignition accessory bus and the relay post (24) of relay (16). The relay post (24) only becomes energized when the headlight switch bus is energized. Accordingly, when the parking lights are switched on, the relays (16 and 17) close as previously described. However, since the headlight switch bus is not energized, there is no voltage impressed on the emitter of the transistor (21) of the sensing unit. Accordingly, the sensing unit will not provide a voltage output regardless of whether the ignition accessory bus is energized or not. Thus, the motorist can, intentionally, leave his parking lights on.

Similarly, if the motorist turns on his headlights, i.e., energizes the headlight switch bus, and then switches off the ignition and the headlight switch leaving the parking lights energized, the invented electronic control circuit will not shut off the parking lights.

Finally, if the motorist wishes to utilize his headlights with the ignition switch off, he can switch on the auxiliary switch which completes a circuit to ground which by-passes the SCR (37). Accordingly, a motorist can use his headlight as an auxiliary light source.

As specified in FIG. 1, an exemplary embodiment of the invented circuit is disclosed which is designed for automobiles with a 12 volt negative ground electrical systems. A common PNP or NPN transistor can be substituted for the zener diode (19) and the blocking diode (20) if the base connection of such a transistor is left unconnected.

While the invented automatic electronic disabling control is described with respect to exemplary, representative and schematic embodiments, it should be apparent to those skilled in the art that numerous variations and modifications can be effected within the scope and spirit of the invention as described hereinabove and as defined and set forth in the appended claims.

We claim:
1. In a control system for automobile lights including a storage battery having two terminals, one terminal being connected to ground, a plurality of lights, a manual light switch connected between the remaining battery terminal and said lights and an ignition switch connected between said battery and other electrical loads on said battery in said automobile, an electronic control circuit, comprising in combination, sensing circuitry means electrically connected to said ignition switch and said manual switch, producing a voltage output when said light switch is closed and said ignition switch is open including, a transistor having an emitter electrically connected to said lights, a base, and a collector, a resistor connected between said collector of said transistor and ground, a current switching means electrically connected between said ignition switch and said base of said transistor, for electrically preventing current flow at said base of said transistor when said ignition switch is closed and for electrically allowing current flow to ground at said base of said transistor when said ignition switch is opened, whereby said transistor electrically isolates said resistor when said ignition switch is closed and whereby, when said light switch is closed and said ignition switch is open, said transistor is conductive to provide a voltage potential across said resistor, said voltage potential across said resistor being the voltage output of said sensing circuitry means;

delay circuitry means receiving said voltage output from said sensing circuitry means for providing voltage output after a time delay, a normally open electrically energized relay switching means connected in series between said manual light switch and said plurality of lights, driver circuitry means for energizing and closing said normally open relay when said manual light switch is closed and for de-energizing said relay responsive to the voltage output from said delay means to thereby interrupt a circuit between said battery and said plurality of lights when said light switch is closed and said ignition switch is open.

2. The circuitry of claim 1 further defined in that said normally open electrically energized relay switching means includes an energizing coil having a first terminal and a second terminal, said first terminal being electrically connected to said manual light switch, said second terminal being electrically connected to said driver circuitry means, whereby an electrical current flowing from said first terminal to said second terminal energizes said coil and closes said relay, thereby completing a circuit between said battery, lights and ground.

3. The circuitry of claim 1 further defined in that said driver circuitry means comprises, in combination, a silicon controlled switch having an anode electrically connected both to said second terminal of said coil and to receive a voltage output of said delay circuitry means, a cathode electrically connected to ground and a gate connection, said silicon controlled switch having a conducting state and a non-conducting state whereby said silicon controlled switch completes an electrical circuit from said manual light switch through said energizing coil to ground when in a conducting state, a voltage pulse generating circuitry means connected between said manual light switch and ground for generating a voltage pulse output at said gate connection of said silicon controlled switch for switching said silicon controlled switch to a conducting state when said manual light switch is closed, whereby said silicon controlled switch changes to a nonconducting state upon receiving the voltage output of said delay circuitry means, thereby interrupting current flow energizing said coil, allowing said relay switch means to open, turning off said lights of said automobile.

4. The circuitry of claim 3 further defined in that said current switching means comprises
- a first zener diode having a zener voltage value and having an anode electrically connected to said ignition switch and a cathode,
- a blocking diode having a cathode electrically connected to said cathode of said zener diode and an anode electrically connected to the base of said transistor,
- a second resistance connected between said anode of said zener diode and ground whereby when said ignition switch is open an electrical potential is impressed across said zener diode which exceeds said zener voltage of said zener diode.

5. The circuitry of claim 3 wherein said current switching means comprises
- a second transistor having an emitter electrically connected to said ignition switch and having a collector electrically connected to said base of said transistor, said base of said second transistor being unconnected, whereby an emitter base junction of said second transistor functions as a zener diode and a collector-base junction of said transistor functions as a blocking diode,
- a resistance electrically connected between said emitter of said second transistor and ground.

6. The circuitry of claim 3 further defined in that said delay circuitry means comprises, in combination,
- two dividing resistances connected in series between said voltage output of said sensing circuitry means and ground,
- a third resistance and a capacitor electrically connected in series between said voltage output of said sensing circuitry means and ground in parallel with said dividing resistances,
- a programmable, uni-junction transistor having a program junction electrically connected between said dividing resistances, an anode electrically connected between said third resistance and said capacitor and a cathode electrically connected to ground, said prorammable uni-junction transistor having a conducting state when the voltage potential at said anode is greater than the voltage potential at said programmed junction, and a nonconducting state when said voltage potential at said anode is less than the voltage potential at said programmed junction, said programmable uni-junction transistor being initially in a nonconducting state, whereby the voltage output from said sensing circuitry means fully charges said capacitor, raising the voltage potential at the anode of said programmable uni-junction transistor for switching it to a conducting state when voltage potential across said capacitor reaches a threshold value, said threshold value being determined by the voltage divider ratio of said dividing resistances, and whereby a time delay is provided, said time delay being the time it takes said voltage potential to cross said capacitor to reach said threshold value,
- a commutating capacitor electrically connected between the respective anodes of said silicone controlled switch and said programmable uni-junction transistor, a voltage potential being impressed across said commutating capacitor, for switching said silicon control switch to a nonconducting state when said programmable uni-junction transistor becomes conducting, said voltage potential across said commutating capacitor being the voltage output of said delay circuitry means.

* * * * *